April 4, 1933.  A. MOORHOUSE  1,903,378
COMBINATION CLUTCH AND BRAKE CONTROL MECHANISM
Filed Feb. 1, 1929  2 Sheets-Sheet 1
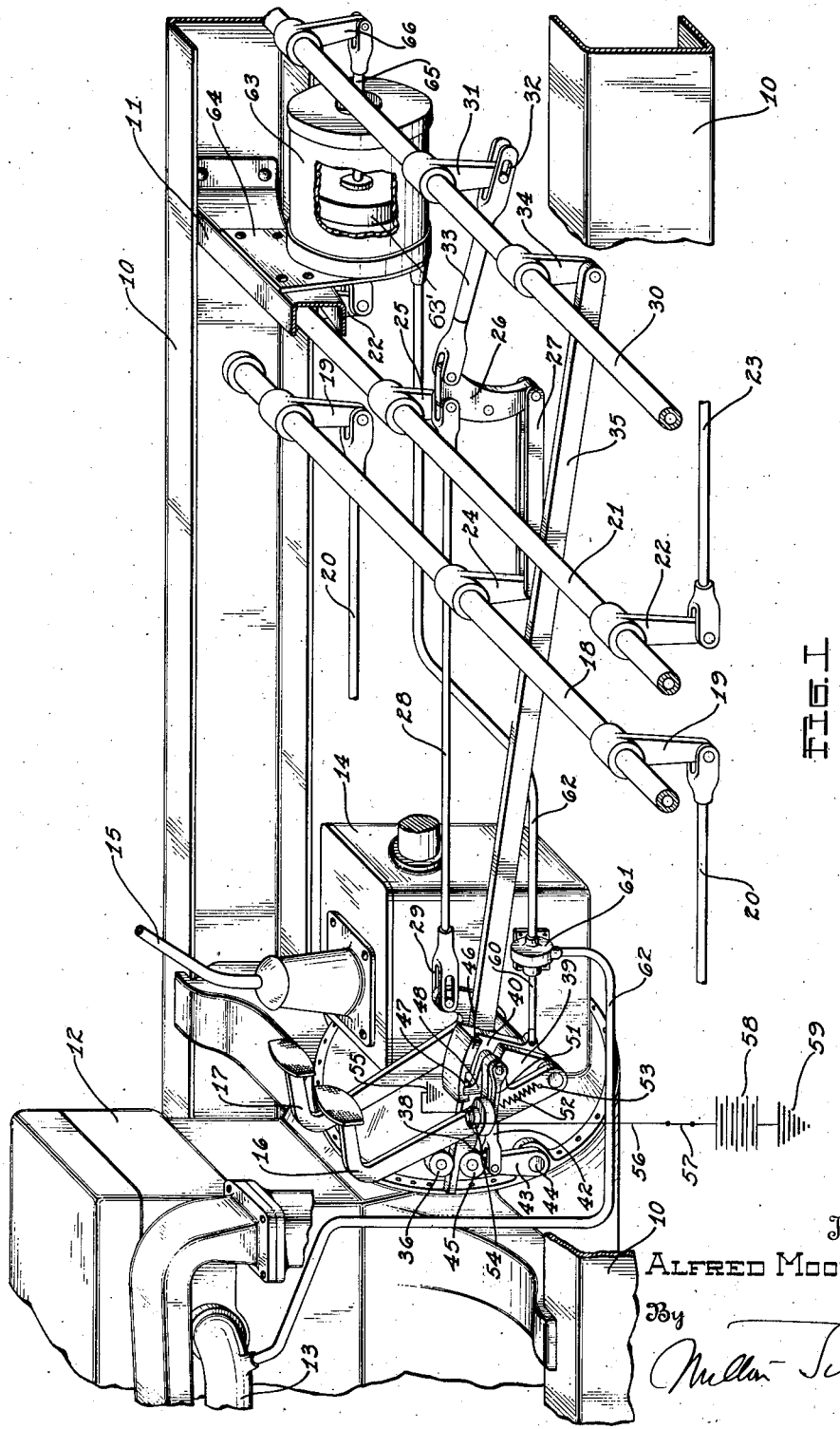
FIG. I
Inventor
ALFRED MOORHOUSE
By
Attorney April 4, 1933. A. MOORHOUSE 1,903,378
COMBINATION CLUTCH AND BRAKE CONTROL MECHANISM
Filed Feb. 1, 1929 2 Sheets-Sheet 2
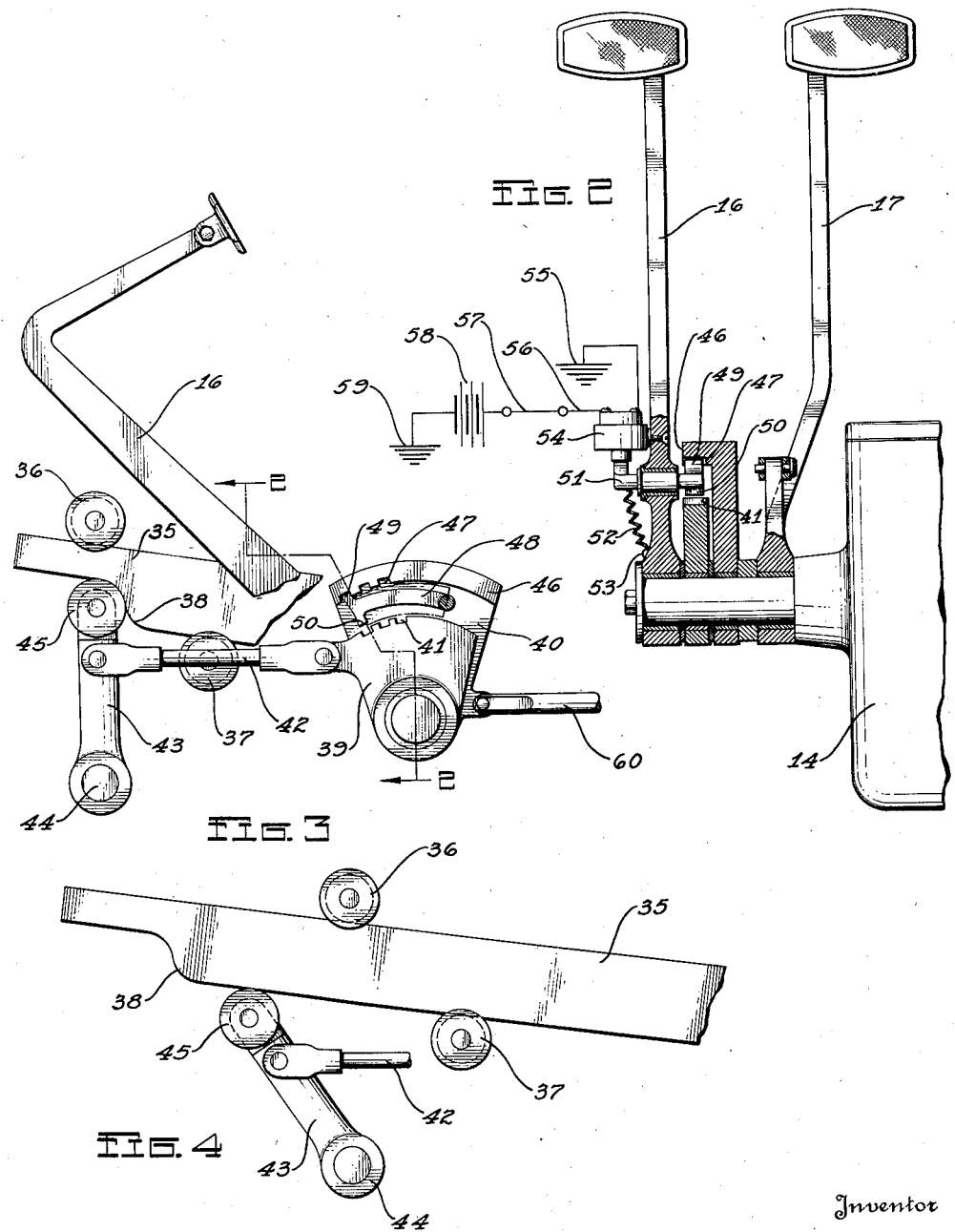
Inventor
ALFRED MOORHOUSE.

Patented Apr. 4, 1933

1,903,378

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

COMBINATION CLUTCH AND BRAKE CONTROL MECHANISM

Application filed February 1, 1929. Serial No. 336,755.

This invention relates to motor vehicles and more particularly to control means therefor.

An object of the invention is to reduce the physical labor incident to the operation of a motor vehicle.

Another object of the invention is to provide control mechanism for a motor vehicle in which the control elements may be operated in different ways and through different connections to meet various driving conditions.

Another object of the invention is to provide control mechanism for a motor vehicle in which the usual control elements, such as the clutch and brakes, may be separately operated in the conventional manner, or in succession by power actuated means under the operator's control.

Another object of the invention is to provide control mechanism for a motor vehicle by which the operation of the clutch and brakes may be effected, either in succession by power actuated means, or independently by physical or manually actuated means, the mechanism also having means for adopting either mode of operation at will.

Another object of the invention is to provide control mechanism for a motor vehicle having power actuated means to operate both the clutch and brakes, and a control element or lever which may be utilized by the operator of the vehicle either to control the power actuated means or to actuate the clutch alone.

Other objects of the invention will appear from the following description taken in connection with the drawings, which form a part of this specification, and in which:

Fig. 1 is a schematic representation in perspective of a part of a motor vehicle, embodying the invention;

Fig. 2 is a view partly in elevation and partly in section taken substantially on line 2—2 of Fig. 3 through the control elements or levers and the selective mechanism;

Fig. 3 is a side elevation of the mechanism shown in Fig. 2, and

Fig. 4 is an elevation of a part of the mechanism of Fig. 3, showing the power clutch actuating mechanism in a different position.

Motor vehicles may be, and frequently are, operated under widely divergent driving or traffic conditions. In areas of congested traffic, such as large cities, driving conditions ordinarily demand an almost continual change of vehicle speed, with many stops and starts. Driving under such conditions involves the repeated operation of the clutch, brakes and other control means, which greatly increases the physical labor of the operator.

To relieve an operator of excessive work, it has been heretofore proposed to actuate the control means, and particularly the clutch and brakes, either wholly or in part, by means operated with power derived from the vehicle engine. Such control actuated means may be easily placed under the operator's control in such a way as to require but little physical exertion.

In mechanism of this nature, it is desirable to place the power actuator for the clutch and brakes under the control of a single element, such as a lever, the initial movement of which effects a disengagement of the clutch, and a further operation of which applies the brakes.

However, vehicles are also frequently operated in less congested areas, as in thinly settled country districts where sustained high speeds are possible and desirable. Under such conditions, independent physical or manual operation of the clutch and brakes is frequently of considerable advantage. An example of the desirability of such independent operation is found in the descent of a long grade, where the operator wishes to keep the clutch engaged in order to utilize the resistance of the engine as a brake, and at the same time wishes occasionally to further reduce the vehicle speed by a momentary application of the brakes. Also, in entering a curve at high speed, the operator may wish to slightly reduce the speed by a brief application of the brakes without interrupting the flow of power through the clutch.

The present invention provides a control mechanism having power means operated from the engine and adapted to fully or partly actuate the clutch releasing mechanism and the brake mechanism, together with independent physical or manually operated means for actuating both the clutch and the brake, together with a selective device by which the operator may utilize either the power actuated mechanism, or the physical or manually operated mechanism, at will.

Referring to the drawings for more specific details of the invention, 10 represents the side members of a chassis frame and 11 a cross member of the frame. Supported on the side members of the frame is an internal combustion engine 12 including an intake manifold 13, and bolted or otherwise secured on the crankcase of the engine is a transmission case 14, having positioned thereon the usual gear shifting lever 15. Pivotally supported on the transmission case is a clutch lever 16 and a foot or service brake lever 17. The brake lever is of the conventional type, adaptable for the operation of a brake mechanism, which may be of any preferred structure; and the clutch lever is also of the conventional type and has associated therewith means for controlling a vacuum booster.

The front wheel brakes, not shown, may be of any suitable structure, adaptable for operation by a rock shaft 18 having thereon levers 19 connected as by rods 20 to the front wheel brakes, not shown. The rock shaft 18 is journaled in the side members of the frame and may be further suitably supported, as by brackets positioned on the cross members of the frame. Journaled on the side members of the frame in parallel relation to the rock shaft 18 is a rock shaft 21 adapted for operating the rear wheel brakes, not shown. The rock shaft 21 has positioned thereon levers 22 having connected thereto brake rods 23 operatively connected to the rear wheel brakes.

The rock shaft 18 has thereon a relatively long lever 24 and the rock shaft 21 has positioned thereon substantially opposite the lever 24 a lever 25, the arm of which is considerably shorter than the lever 24, and pivoted to the arm of the lever 25 is an equalizing or floating lever 26 having one end connected by a link 27 to the lever 24 and its other end connected to a rod 28 having an overrunning connection 29 to the foot or service brake lever 17. This brake mechanism is coupled with and augmented by a vacuum operated booster connected to operate the clutch and brake mechanism simultaneously.

Journaled on the side members of the frame is a rock shaft 30 having thereon a lever 31 connected by an overrunning connection 32 to one end of a rod 33, the other end of which is connected to the equalizer or floating lever 26. The rock shaft 30 also has thereon a lever 34 connected to one end of a rod 35, the other end of which is slidably supported between the levers 16 and 17 by suitable rollers 36 and 37 and the free end of the rod has formed thereon a cam 38, the object of which will hereinafter appear.

Two segments 39 and 40 are pivotally mounted between the clutch lever 16 and the brake lever 17 for independent movement with respect thereto. The segment 39 has a ratchet 41 and is connected by a rod 42 to a lever 43 on the clutch throw-out shaft 44, the lever 43 having positioned in its free end a roller 45 engaging the cam 38 on the forward end of the rod 35. The segment 40 has a circumferential flange 46 which extends over the periphery of the segment 39 and is provided with a ratchet 47 arranged in opposed relation to the ratchet 41.

A pawl 48 is pivoted on the clutch lever. The pawl has two engaging ends 49 and 50 adapted to engage alternately the ratchets 41 and 47, and an arm 51 to which is attached one end of a coil spring 52, the other end of which is suitably anchored as at 53. This spring normally retains the pawl in engagement with the ratchet 41 on the segment 39 in which position the clutch lever 16 operates the clutch independently and the brake lever 17 operates the brakes independently.

A solenoid 54, positioned on the clutch lever 16, has one terminal grounded as at 55 and its other terminal connected by a suitable lead 56 to one terminal of a switch 57 conveniently positioned for operation, and the other terminal of the switch is connected to a suitable source of electrical supply, such as a battery 58, the battery being grounded as indicated at 59. When the switch is closed, the solenoid 54 is energized and the pawl 48 is actuated thereby to disengage the ratchet 41 on the segment 39, through which the clutch is normally operated, and to engage the ratchet 47 on the segment 40.

The segment 40 is connected by a rod 60 to a suitable valve 61 interposed in a pipe line 62 leading from the intake manifold 13 of the engine to a cylinder 63 supported on a bracket 64, and the cylinder 63 has therein a piston 63′, the rod 65 of which is connected to a lever 66 on the rock shaft 30. With the switch in a closed position, a forward movement of the clutch lever opens the valve 61 in the pipe line 62 and admits suction to the head of the piston to operate the brake mechanism through the piston rod 65, the lever 66 and the rock shaft 30, the lever 31 and the rod 33 connecting the lever 31 to the floating lever 26, through which the rock shafts are operated to apply the brakes. Simultaneously the lever 34 on the rock shaft 30 moves the rod 35 forward, so that the cam 38 on the end thereof engages the roller 45 in the free end of the lever 43, moving the lever forward to operate the throw-out shaft 44 of the clutch mechanism.

The physical or manual power applied in actuating the clutch lever is negligible or nil, since it is only necessary to open the valve 61 to cause the simultaneous operation of the brake mechanism and the clutch by the power applied through the instrumentality of the booster.

The actuation above described, i. e., the combined operation of the clutch and the brake mechanism by the vacuum operated booster, is effected without movement of the brake operating lever 17 by reason of the overrunning connection 29 between the lever and the operating rod 28. However, the power applied to the brakes through the vacuum operated booster may at any time be further augmented by physical power applied to the brake lever 17.

When the switch 57 is open, the solenoid 54 is de-energized and the pawl is disengaged from the ratchet 47 and is engaged with the ratchet 41. In this position, the clutch lever may be operated at will without affecting the brake mechanism, and the brake mechanism may be operated by the brake operating lever 17 without affecting the vacuum operated booster, this being made possible by the overrunning connection 32 between the brake mechanism and the rock shaft 30.

Although this invention has been described in connection with certain specific embodiments, the principles involved are susceptible of numerous other applications which will readily occur to persons skilled in the art. The invention is, therefore, to be limited only as indicated by the scope of the appended claims.

Having thus described the various features of my invention, what I claim as new and desire to secure by Letters Patent is:

1. In a motor vehicle, the combination with a brake and a clutch, of means for operating the clutch, means for operating the brake, and means actuated by the motor for operating the clutch and brake concomitantly by movement of the clutch operating means only.

2. In a motor vehicle, the combination with a brake and a clutch, of means for manually operating the brake, means for manually operating the clutch, and power actuated means for operating the brake and clutch concomitantly controlled by the clutch operating means.

3. In a motor vehicle, the combination with a motor, a brake and a clutch, of a manually controlled lever for operating the brake, a manually controlled lever for operating the clutch, means operated by the motor for the successive operation of the clutch and brake and electro-magnetic means operable at will for adopting either mode of operation.

4. In a motor vehicle, the combination with a motor, a brake and a clutch, of means for separately operating the brake, means for separately operating the clutch, a power actuated device for operating the clutch and brake in succession by actuation of the clutch operating means and means operable at will for selecting either mode of operation.

5. In a motor vehicle, the combination with a motor, a brake and a clutch, of a single power device actuated by the motor and operatively connected to the brake and clutch, a control for the clutch, a control for the power device and means for selectively operating the controls.

6. In a motor vehicle, the combination with a motor, a brake and a clutch, of a power device actuated by the motor, means operatively connecting the power device to the brake and the clutch, an operating lever for the brake, a manual control member for the clutch, a control member for the power device, an operating lever common to both control members, and means carried thereby for selectively engaging the control members.

7. In a motor vehicle, the combination with a motor, a brake and a clutch, of a power device actuated by the motor, means operatively connecting the power device to the brake and the clutch, a lever for operating the brake independently, a control member for manually controlling the clutch, a control member for the power device, an operating lever common to both members, and means operable at will carried by the lever common to both members for selectively engaging the members.

8. In a motor vehicle, the combination with a motor, a brake and a clutch, of a power device actuated by the motor, a rock shaft operatively connected to the power device, means operatively connecting the rock shaft to the brake, means operatively connecting the rock shaft to the clutch, an operating lever for the brake, a control member for the clutch, a control member for the power device, an operating lever common to both members and means carried by the operating lever common to both members for selectively engaging the members.

9. In a motor vehicle, the combination with a motor, a brake and a clutch, of a power device actuated by the motor, a rock shaft operatively connected to the power device, means operatively connecting the rock shaft to the brake including an overrunning connection, means operatively connecting the rock shaft to the clutch including a cam for actuating the clutch, an operating lever for the brake and means connecting the operating lever to the brake including an overrunning connection, a control member for the clutch, a control member for the power device, a lever common to both members and means carried by the lever for selectively engaging and locking the members to the lever.

10. In a motor vehicle, the combination with a motor, a brake and a clutch, of a power device actuated by the motor, means operatively connecting the power device to the brake and the clutch, a control element for the power device, an oscillatory member connected to the control element, a second oscillatory member connected to the clutch, a lever common to both members, and means carried by the lever for selectively engaging the members.

11. In a motor vehicle, the combination with a motor, a brake and a clutch, of a power device actuated by the motor, means operatively connecting the power device to the brake and to the clutch, a control valve for the power device, an oscillatory member connected to the control valve, a second oscillatory member connected to the clutch, opposed ratchets on the oscillatory members, a lever common to both members, a pawl carried by the lever and means to actuate the pawl for selectively engaging the ratchets.

12. In a motor vehicle, a clutch, a brake, levers to operate said clutch and brake, a power device arranged, when actuated, to actuate said clutch and brake and means adapted to control said power device arranged for selective engagement with one of said levers.

13. In a motor vehicle, the combination with a brake and a clutch, of means for operating the clutch, means for operating the brake, and power actuated means for operating the clutch and brake concomitantly by movement of the clutch operating means only.

14. In a motor vehicle, the combination with a motor, a brake and a clutch, of means for independent operation of the brake, means for independent operation of the clutch, and means associated with and controlled by the clutch pedal and operated by the motor for concomitant operation of the brake and clutch.

15. In a motor vehicle having a clutch and brakes, means for actuating the clutch and brakes comprising a mechanism connected to the clutch, a mechanism connected to the brakes, a power device, and inter-connecting means between the mechanisms and the power device, the application of manual power disengaging the clutch and applying the brakes with the assistance of power from the power device, said inter-connecting means including a lost motion connection whereby, after the clutch has been fully disengaged, continued manual power, assisted by further power from the device, will further apply the brake.

In testimony whereof I affix my signature.

ALFRED MOORHOUSE.